(12) United States Patent
Yoon et al.

(10) Patent No.: US 10,905,307 B2
(45) Date of Patent: Feb. 2, 2021

(54) DISHWASHING SYSTEM AND ROBOT DEVICE

(71) Applicants: LIFE ROBOTICS INC., Tokyo (JP); YOSHINOYA HOLDINGS CO., LTD., Tokyo (JP)

(72) Inventors: Woo-Keun Yoon, Tokyo (JP); Shigeru Haruki, Tokyo (JP)

(73) Assignees: LIFE ROBOTICS INC., Tokyo (JP); YOSHINOYA HOLDINGS CO., LTD., Tokyo (JP)

( * ) Notice: Subject to any disclaimer, the term of this patent is extended or adjusted under 35 U.S.C. 154(b) by 103 days.

(21) Appl. No.: 16/272,897

(22) Filed: Feb. 11, 2019

(65) Prior Publication Data

US 2019/0167065 A1    Jun. 6, 2019

Related U.S. Application Data

(63) Continuation of application No. PCT/JP2017/029232, filed on Aug. 11, 2017.

(30) Foreign Application Priority Data

Aug. 14, 2016 (JP) .................................. 2016-159049

(51) Int. Cl.
*A47L 15/24* (2006.01)
*A47L 15/00* (2006.01)
(Continued)

(52) U.S. Cl.
CPC ............... *A47L 15/24* (2013.01); *A47L 15/00* (2013.01); *B25J 9/1697* (2013.01); *B25J 13/08* (2013.01);
(Continued)

(58) Field of Classification Search
CPC combination set(s) only.
See application file for complete search history.

(56) References Cited

U.S. PATENT DOCUMENTS

2003/0029139 A1 * 2/2003 Ng .................... A47L 15/501
53/426
2006/0280587 A1   12/2006 Guerra et al.
(Continued)

FOREIGN PATENT DOCUMENTS

JP    S61-173873 A    8/1986
JP    H4-089686 U    8/1992
(Continued)

OTHER PUBLICATIONS

International Search Report issued in PCT/JP2017/029232 dated Oct. 31, 2017 with English Translation (7 pages).

*Primary Examiner* — Cristi J Tate-Sims
(74) *Attorney, Agent, or Firm* — Nakanishi IP Associates, LLC

(57) ABSTRACT

A dishwashing system includes: a conveyor-type dishwasher that washes tableware in a washing machine main body while conveying the tableware by means of a conveyor; a robot device having a robot arm mechanism that is installed in the vicinity of a picking area outside of the washing machine main body in order to pick up tableware that is conveyed to the picking area by conveyors, and to transfer the tableware to a stock area; and a control device that generates an enabling signal relating to operations of the conveyors with respect to the dishwasher.

20 Claims, 8 Drawing Sheets

(51) Int. Cl.
  *G06T 7/00*   (2017.01)
  *B25J 18/02*  (2006.01)
  *G06T 7/70*   (2017.01)
  *B25J 9/16*   (2006.01)
  *B25J 13/08*  (2006.01)
  *B25J 9/04*   (2006.01)

(52) U.S. Cl.
  CPC ............ *B25J 18/02* (2013.01); *B25J 18/025* (2013.01); *G06T 7/00* (2013.01); *G06T 7/70* (2017.01); *B25J 9/044* (2013.01)

(56) References Cited

U.S. PATENT DOCUMENTS

| | | | |
|---|---|---|---|
| 2010/0043834 A1* | 2/2010 | Scheringer | A47L 15/241 134/25.2 |
| 2015/0101639 A1* | 4/2015 | Heppner | A47L 15/24 134/18 |
| 2018/0036889 A1* | 2/2018 | Birkmeyer | B25J 9/1697 |

FOREIGN PATENT DOCUMENTS

| | | |
|---|---|---|
| JP | H7-290781 A | 11/1995 |
| JP | H8-194802 A | 7/1996 |
| JP | H8-323669 A | 12/1996 |
| JP | H10-063927 A | 3/1998 |
| JP | H10-323429 A | 12/1998 |
| JP | 2000-203715 A | 7/2000 |
| JP | 2004-147761 A | 5/2004 |
| JP | 2006-034897 A | 2/2006 |
| JP | 2007-069239 A | 3/2007 |
| JP | 2008-206909 A | 9/2008 |
| JP | 2008206909 A * | 9/2008 |
| JP | 2008-542050 A | 11/2008 |
| JP | 5030183 B2 | 9/2012 |
| JP | 2014-141327 A | 8/2014 |
| JP | 2016-099257 A | 5/2016 |
| WO | 2014/157189 A1 | 10/2014 |

* cited by examiner

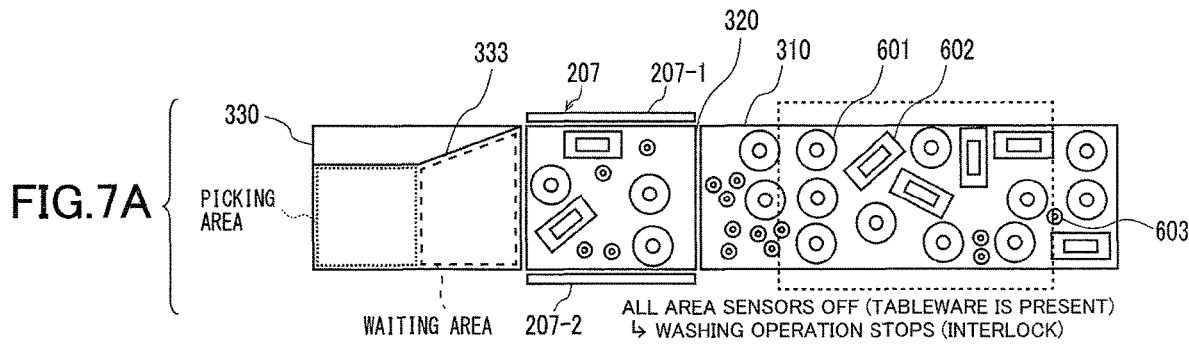
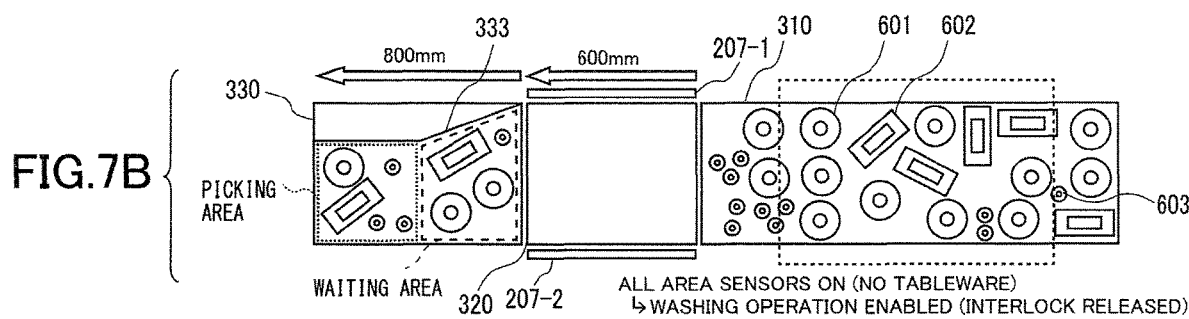
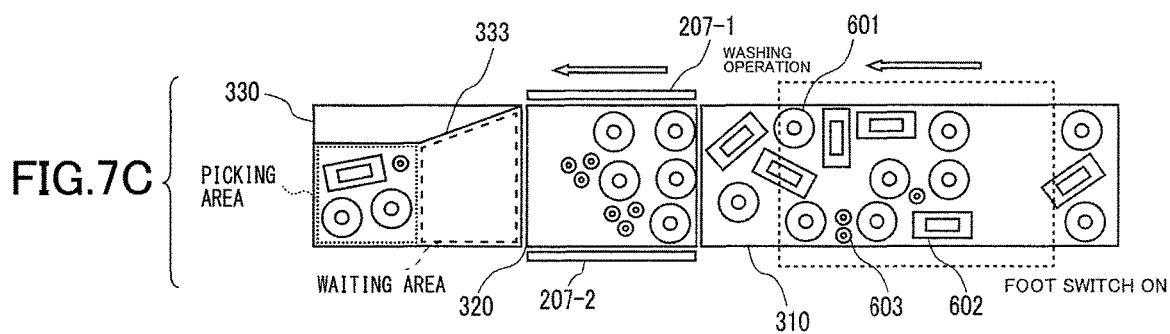
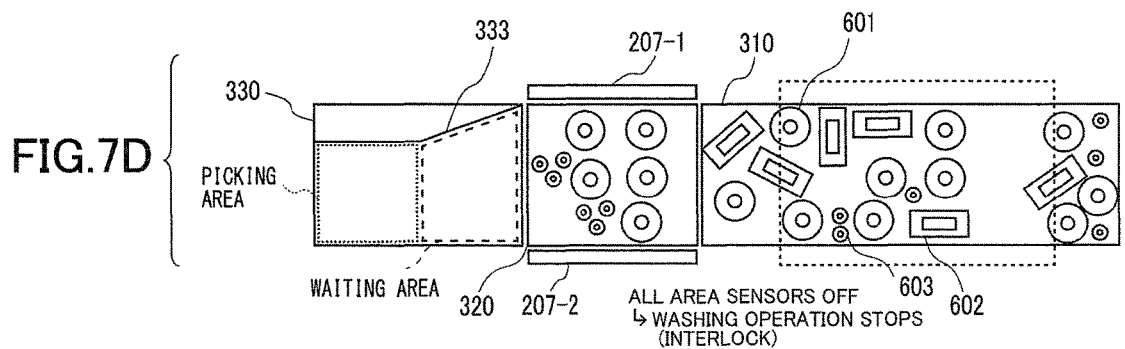

DISHWASHING SYSTEM AND ROBOT DEVICE

CROSS-REFERENCE TO RELATED APPLICATIONS

This application is a continuation application of International Patent Application No. PCT/JP2017/029232 filed on Aug. 11, 2017, which is based upon and claims the benefit of priority from the prior Japanese Patent Application No. 2016-159049, filed Aug. 14, 2016 the entire contents of which are incorporated herein by reference.

FIELD

Embodiments described herein relate to a dishwashing system and a robot device.

BACKGROUND

Due to a shortage of labor, one of the important tasks that currently faces the food service industry is to achieve labor savings. The introduction of dishwashers is one measure for achieving such labor savings. The process of washing dishes involves removing leftover food from tableware on a return shelf, immersing the tableware in a dipping sink, and thereafter performing preliminary washing of the tableware using a brush or the like, and then placing the tableware on a washing rack. The washing rack on which the tableware has been placed is carried into a dishwasher and set at a predetermined position, and a washing switch of the dishwasher is then operated. By this means, a washing process is started. After the washing ends, the washing rack of the dishwasher is carried out onto a clean table, and the tableware that was washed is sorted into respective kinds of tableware such as large bowls, plates, and small bowls, which are then stacked on a stock rack. Because it is necessary for a worker to perform these operations during gaps between other work such as cooking food, serving food and clearing tables, not only is it extremely troublesome for the worker to perform the aforementioned dishwashing operations, but it is also necessary for the worker to pay attention to the timing at which the dishwashing operation ends.

SUMMARY OF INVENTION

Technical Problem

A purpose of the present invention is to provide a dishwashing system and a robot device that contribute to reducing the labor of a worker and also reduce the troublesomeness of a series of operations relating to dishwashing.

Solution to Problem

According to one aspect of the present invention, there is provided a dishwashing system which comprises: a conveyor-type dishwasher which washes tableware in a washing machine main body while conveying the tableware by means of a conveyor; a robot device having a robot arm mechanism that is installed in the vicinity of a picking area to pick up tableware that is conveyed to the picking area from a washing chamber by a conveyor, and transfer the tableware to a stock area; and a control device that generates an enabling signal relating to operations of the conveyor with respect to the dishwasher.

According to another aspect of the present invention, there is provided a robot device which comprises: a robot arm mechanism that is installed in the vicinity of a picking area to pick up a work piece in the picking area and transfer the work piece to a stock area; a camera that photographs the picking area; an image processing section that processes an image of the picking area that is photographed by the camera, and determines whether or not the work piece is present, a kind of the work piece, a position of the work piece, and a posture of the work piece; a release position determining section that determines a release position on the stock area based on a kind of the work piece and a number of stacked pieces of the work piece in the stock area; a picking operation control section that controls a picking operation by the robot arm mechanism based on the pick-up position and the release position; and an output section that, when the work piece is not present in the picking area or when a number of pieces of the work piece is equal to or less than a predetermined number, outputs a signal indicating that the work piece is not present in the picking area or that a number of pieces of the work piece is equal to or less than a predetermined number to an external device.

BRIEF DESCRIPTION OF THE VIEWS OF THE DRAWING

FIGS. 7A, 7B, 7C, and 7D are plan views illustrating movements of a washing conveyor and a relay conveyor that relate to a dishwashing operation in the present embodiment.

DETAILED DESCRIPTION

A dishwashing system according to an embodiment of the present invention is described below with reference to the drawings.

Figure 1:
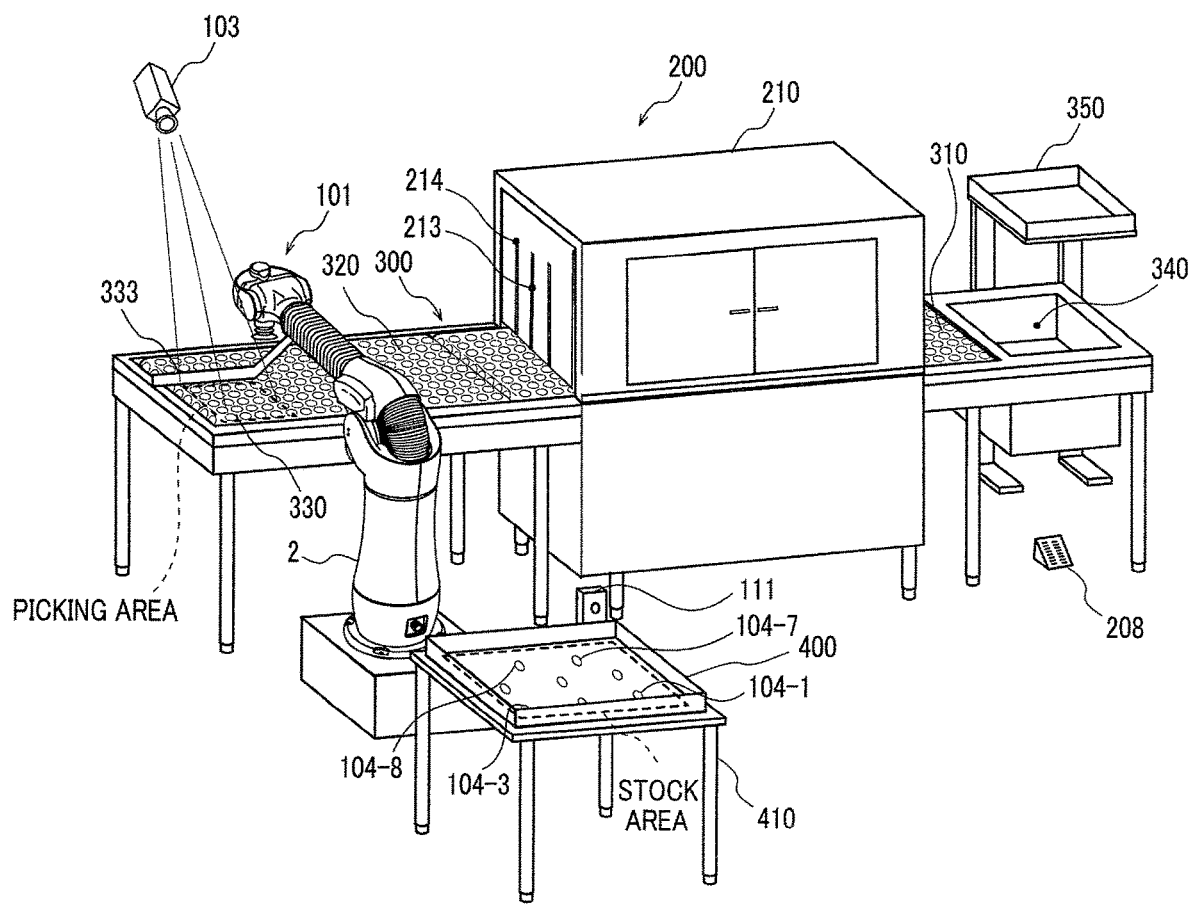
FIG. 1 is a perspective view illustrating the external appearance of an entire dishwashing system according to one embodiment of the present invention.
Figure 2:
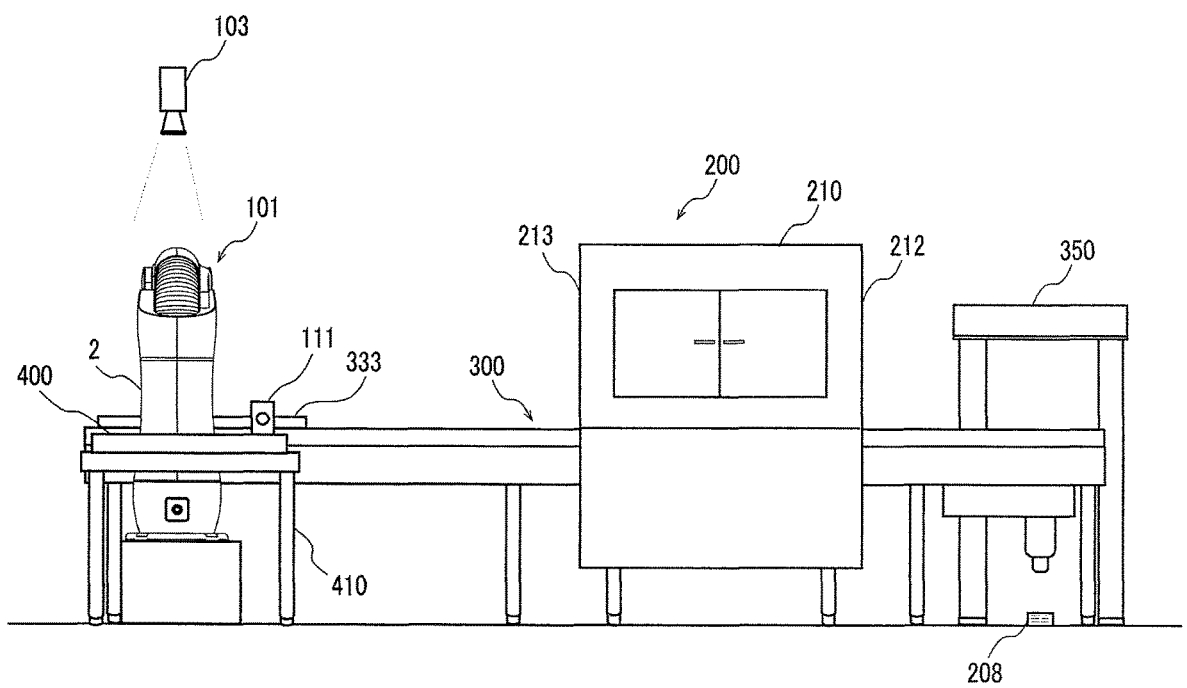
FIG. 2 is a side view of the dishwashing system in FIG. 1.
Figure 3:
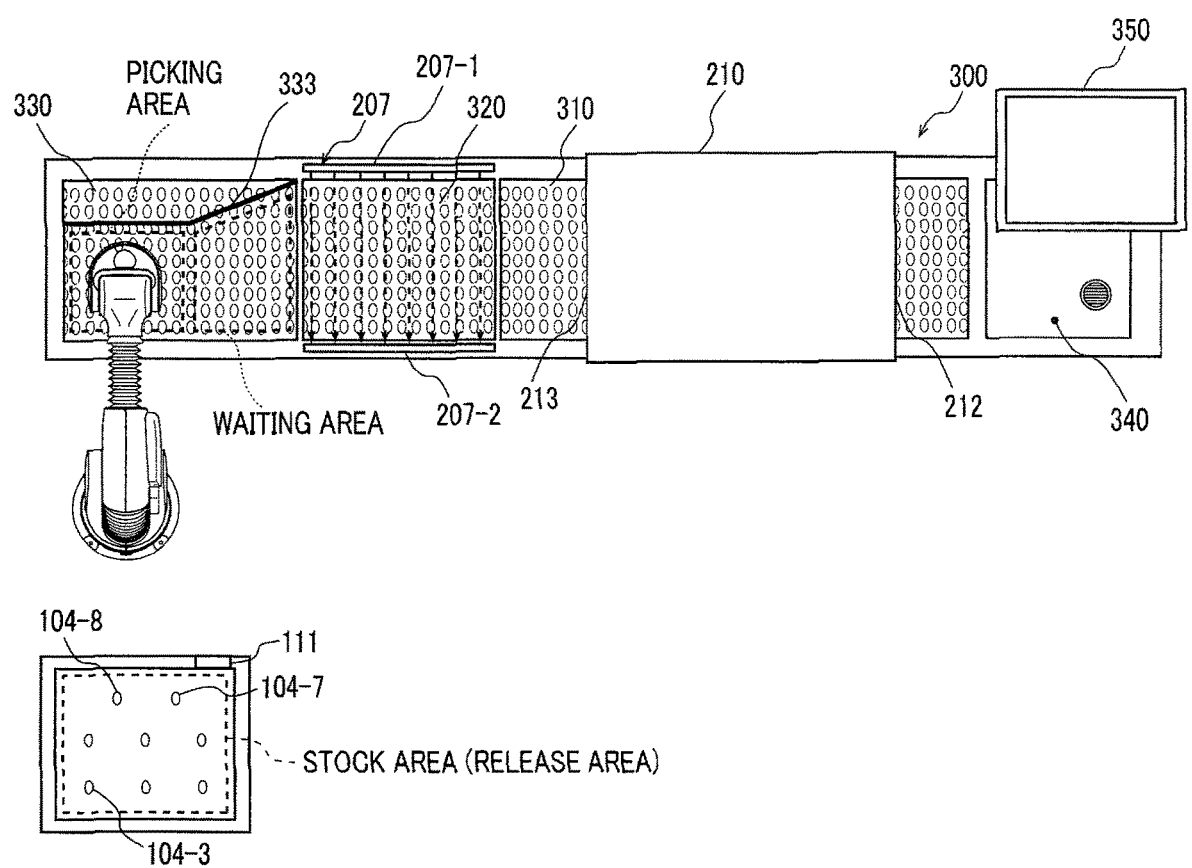
FIG. 3 is a plan view of the dishwashing system in FIG. 1.

FIG. 1 is a perspective view of the dishwashing system according to the present embodiment, FIG. 2 is a side view of the dishwashing system according to the present embodiment, and FIG. 3 is a plan view of the dishwashing system according to the present embodiment. The dishwashing system according to the present embodiment includes: a conveyor-type dishwasher 200 that washes, in a washing chamber that is inside a washing machine main body 210, a work piece, in this case, tableware, as an article to be washed while conveying the work piece by means of conveyors 310, 320 and 330 which have the same width, for example, 500 mm, that are arranged in single file; a robot device having a robot arm mechanism 101 which is installed in the vicinity of a predefined picking area which is outside of the washing machine main body 210 to pick up tableware conveyed by the conveyors 310, 320 and 330 to the picking area and transfer the tableware to a stock area of a stock rack 400; and a control device, described later, which generates an enabling signal relating to operations of the conveyors 310, 320 and 330 with respect to the dishwasher 200 when tableware is not present in the picking area. Note that, a configuration may be adopted in which the control device is mounted in the robot device. Further, although the conveyors 310, 320 and 330 are described hereunder as belts with multiple holes on which tableware is directly placed in an inverted posture, the conveyors 310, 320 and 330 may also be tray conveyors.

A machine chamber is provided in a lower portion of the washing machine main body 210, and a washing chamber that executes a washing operation and a rinsing operation is provided in an upper portion of the washing machine main body 210. A washing water tank that stores washing water and a washing pump that pumps washing water are housed in the machine chamber in order to jet out washing water from a washing nozzle onto tableware. Further, a rinsing water tank and a rinsing pump are also housed in the machine chamber in order to jet out rinsing water onto tableware from a rinsing nozzle.

The washing chamber is provided inside the washing machine main body 210. The washing chamber is penetrated from a carry-in port 212 to a carry-out port 213. To prevent washing water and rinsing water in the washing chamber from scattering to outside of the washing chamber, an unshown carry-in curtain is hung over the carry-in port 212 of the washing chamber, and a carry-out curtain 214 that is divided into strip shapes is hung over the carry-out port 213 of the washing chamber.

A conveyor (referred to as washing conveyor or first conveyor) 310 for conveying tableware is provided inside the washing chamber of the washing machine main body 210. Tableware that is placed on the washing conveyor 310 is carried into the washing chamber which is inside the washing machine main body 210 from the carry-in port 212, and is carried out from the carry-out port 213. Note that, the direction from the carry-in port 212 toward the carry-out port 213 (direction from right to left on the page surface) is defined as downstream, and the direction from the carry-out port 213 to the carry-in port 212 (direction from left to right on the page surface) is defined as upstream.

A preliminary washing sink 340 equipped with a rotating brush is provided adjacent to the washing conveyor 310, at a position that is on the upstream side thereof. A dipping sink may be installed instead of the preliminary washing sink 340. A drainer rack 350 for temporarily storing tableware that was subjected to preliminary washing is installed, for example, above the preliminary washing sink 340. A foot switch 208 is arranged on the floor surface below the preliminary washing sink 340. A worker performs preliminary washing of tableware, and then places the tableware at an upstream edge part of the washing conveyor 310 or places the tableware on the drainer rack 350. When the foot switch 208 is stepped on and pressed downward by a worker, on the condition that a washing operation by the dishwasher 200 is enabled by a control device that is described later, the washing conveyor 310 moves and a washing operation in which washing water and rinsing water are jetted out starts.

A conveyor (hereunder, referred to as relay conveyor) 320 is installed in tandem with the washing conveyor 310 on the downstream side thereof. A conveyor (hereunder, referred to as picking conveyor or second conveyor) 330 is installed in tandem with the relay conveyor 320 on the downstream side thereof. The washing conveyor 310, the relay conveyor 320 and the picking conveyor 330 constitute a series of conveyors 300 that sequentially convey tableware. The washing conveyor 310 is longer than the length of the washing machine main body 210, and for example has a machine length of 1500 mm. The picking conveyor 330, for example, has a machine length of 800 mm. The relay conveyor 320 is shorter than the picking conveyor 330, and for example has a machine length of 600 mm. A light-emitting section array 207-1 and a light-receiving section array 207-2 of an area sensor 207 are arranged on the two sides of the relay conveyor 320 so as to sandwich the relay conveyor 320. The area sensor 207 indicates an "off" state when tableware is present on the relay conveyor 320, and indicates an "on" state when tableware is not present on the relay conveyor 320.

The relay conveyor 320 is a conveyor that passes tableware that was discharged from the washing conveyor 310 to the picking conveyor 330, and operates in response to the operation of one of the washing conveyor 310 and the picking conveyor 330. The conveyor that the relay conveyor 320 operates in response to operation of among the washing conveyor 310 and the picking conveyor 330 dynamically changes in accordance with the situation as described later. By this means it is possible for a picking operation and a washing operation to be effectively executed simultaneously by parallel processes, and not by consecutive processes (sequential processes).

A guide rail 333 is installed above the picking conveyor 330 at a height such that the guide rail 333 is separated slightly from the belt surface so as not to inhibit movement of the picking conveyor 330. The guide rail 333 is a plate material formed in a "dogleg" shape, and is composed of a portion that inclines relative to the center line of the belt and a portion that is parallel to the center line of the belt. While moving for a distance of approximately half the machine length from the upstream side, the tableware on the picking conveyor 330 is drawn, for example, 200 mm closer to the front side by the inclined portion of the guide rail 333. A picking area (for example, 400 mm×400 mm) of the robot arm mechanism 101 is aligned with a square region of half the machine length on the downstream side of the picking conveyor 330 that is regulated by the parallel portion of the guide rail 333.

A columnar support section 2 of the polar coordinates-type robot arm mechanism 101 in which a turning rotational joint, an upward/downward rotational joint and a linear motion joint are arranged in that order from a base is erectly provided in the vicinity of the picking area. In this example, a linear extension and retraction mechanism, described later, that has a long extension length is adopted as the linear motion joint, although the present invention is not limited thereto. The entire picking area is included within the movable range of the robot arm mechanism 101. A camera 103 is installed above the picking area in a manner so that the field of view of the camera 103 includes the picking area. An image of the inside of the picking area that is acquired by the camera 103 is processed by the robot device to thereby recognize tableware pieces. Tableware pieces that were conveyed to the picking area by the picking conveyor 330 are picked up sequentially by the robot arm mechanism 101. A stock stand 410 is disposed on the front side from the picking area on the picking conveyor 330 in a manner such that the columnar support section 2 of the robot arm mechanism 101 is sandwiched between the stock stand 410 and the picking area. The stock rack 400 is mounted on the stock stand 410. A stock area (also referred to as release area) of the robot arm mechanism 101 is aligned with the inside of the stock rack 400. The entire stock area is included within the movable range of the robot arm mechanism 101. Release positions are predefined at a plurality of locations, in this example, seven locations, inside the stock area. A piece of tableware that is picked up by the robot arm mechanism 101 in the picking area is released at a release position in the stock area. Reflection-type photoelectric sensors (tableware sensors) 104-1 to 104-7 are mounted at the release positions, respectively. The respective tableware sensors 104-1 to 104-7 indicate an "on" state when tableware is present at the release position corresponding to the relevant tableware sensor, and indicate an "off" state when tableware is not present at the release position.

Figure 4:
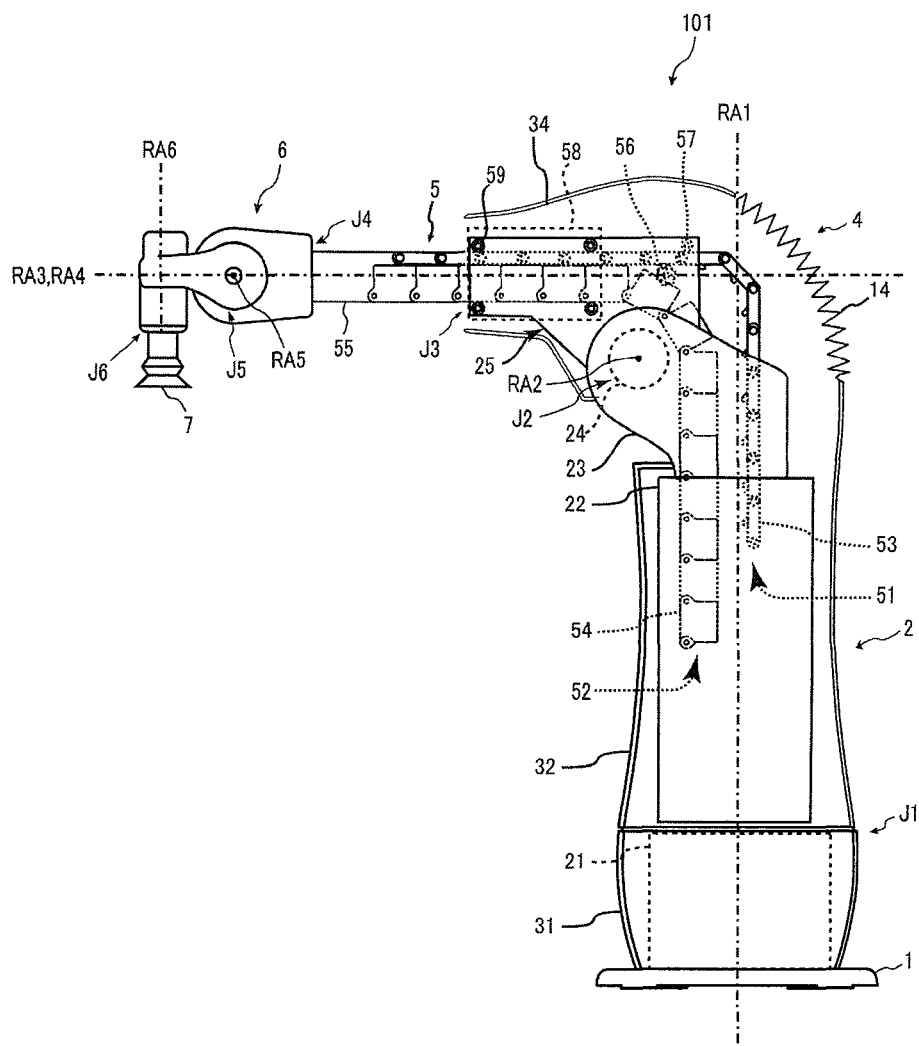
FIG. 4 is a side view illustrating an internal structure of a robot arm mechanism in FIG. 1.

FIG. 4 illustrates an internal structure of the robot arm mechanism 101. Although in this case a vertical articulated-type robot arm mechanism equipped with a linear extension and retraction mechanism is described as an example of the robot arm mechanism 101, the robot arm mechanism 101 may be a common vertical articulated-type robot arm mechanism that is not equipped with a linear extension and retraction mechanism. A robot arm mechanism 101 has a plurality of joints J1 to J6. The robot arm mechanism 101 includes a base 1, the columnar support section 2, an up/down section 4, an arm section 5 and a wrist section 6. A suction pad 7 for attaching by suction to tableware is attached to the tip of the wrist section 6. The columnar support section 2 forming a cylindrical body is installed vertically on the base 1. The columnar support section 2 houses a first joint J1 as a turning rotational joint. An axis of rotation RA1 of the first joint J1 is vertical. The columnar support section 2 has a columnar support lower frame 21 and a columnar support upper frame 22. One end of the lower frame 21 is connected to a fixed section of the first joint J1. The other end of the lower frame 21 is installed on the base 1. The lower frame 21 is covered by a cylindrical housing 31. The upper frame 22 is connected to a rotating section of the first joint J1, and axially rotates on the axis of rotation RA1. The upper frame 22 is also covered by a cylindrical housing 32. The upper frame 22 rotates with respect to the lower frame 21 accompanying rotation of the first joint J1, and by this means the up/down section 4 and the arm section 5 turn. First and second piece strings 51 and 52 of a third joint J3 as a linear extension and retraction mechanism are housed in an inner hollow of the columnar support section 2 that forms a cylindrical body.

The up/down section 4 that houses a second joint J2 is arranged at an upper part of the columnar support section 2. The second joint J2 is a bending rotation joint. An axis of rotation RA2 of the second joint J2 is horizontal. The up/down section 4 has a pair of side frames 23 which forms a fixed section of the second joint J2. The pair of side frames 23 is installed on the upper frame 22. A cylindrical body 24 that houses a motor is rotatably supported by the pair of side frames 23. The cylindrical body 24 axially rotates by means of motor rotation. A sending-out mechanism 25 is mounted on the peripheral surface of the cylindrical body 24. A drive gear 56, a guide roller 57 and a roller unit 58 are supported by a frame 26 of the sending-out mechanism 25. The sending-out mechanism 25 rotates accompanying axial rotation of the cylindrical body 24, and the arm section 5 that is supported by the sending-out mechanism 25 rotates upward and downward. The back face of the up/down section 4 is covered by a bellows cover 14 that expands and contracts so as to follow upward and downward rotation of the up/down section 4.

The third joint J3 is provided by a linear extension and retraction mechanism. The linear extension and retraction mechanism is equipped with a structure that was newly developed by the present inventors, and is clearly distinguished from a so-called conventional linear motion joint from the viewpoint of the movable range thereof. The arm section 5 of the third joint J3 is transitionable between a bendable state and a state in which linear rigidity is secured. The arm section 5 has the first piece string 51 and the second piece string 52. The first piece string 51 includes a plurality of first pieces 53 that are bendably connected. The first pieces 53 are formed in a substantially flat plate shape. The first pieces 53 are bendably connected at hinge sections at end parts thereof. The second piece string 52 includes a plurality of second pieces 54. Each second piece 54 is typically formed in the shape of a groove-like body having an inverted C-shape in transverse section or as a hollow square-shaped cylindrical body. The second pieces 54 are bendably connected at hinge sections at an end part of a bottom plate thereof. Bending of the second piece string 52 stops at positions at which end faces of side plates of the second pieces 54 butt against each other. At such positions, the second piece string 52 is linearly arranged. A leading first piece 53 of the first piece string 51 and a leading second piece 54 of the second piece string 52 are connected by a head piece 55. For example, the head piece 55 has a shape that integrates the second piece 54 and the first piece 53. The first and second piece strings 51 and 52 are pressed together and firmly joined to each other when passing through a gap between upper and lower rollers 59 of the roller unit 58. As a result of being joined to each other, the first and second piece strings 51 and 52 transition to a linearly rigid state, and thereby constitute the columnar arm section 5. When the arm section 5 is drawn backward, the first and second piece strings 51 and 52 are separated at the rear of the roller unit 58 and transition to a bent state.

The drive gear 56 is arranged together with the guide roller 57 at the rear of the roller unit 58. The drive gear 56 is connected to an unshown motor unit. The motor unit generates motive power for rotating the drive gear 56. A linear gear 539 is formed along the connecting direction at the width center of a face on the inner side of the first piece 53, that is, a face on the side on which the first piece 53 joins with the second piece 54. The linear gears 539 which are adjacent when a plurality of the first pieces 53 are linearly aligned are connected linearly to constitute a long linear gear. The drive gear 56 is meshed with the linear gear 539 of the first piece 53 that is pressed by the guide roller 57. The linear gears 539 that are connected linearly constitute a rack-and-pinion mechanism together with the drive gear 56. When the drive gear 56 rotates forward, the first and second piece strings 51 and 52 are sent out in the forward direction from the roller unit 58. When the drive gear 56 rotates backward, the first and second piece strings 51 and 52 are pulled back to the rear of the roller unit 58. The first and second piece strings 51 and 52 that were pulled back are separated from each other between the roller unit 58 and the drive gear 56. The separated first and second piece strings 51 and 52 each return to a bendable state. The first and second piece strings 51 and 52 that returned to a bendable state both bend in the same direction (inward) and are vertically housed inside the columnar support section 2. At this time, the first piece string 51 is housed in a substantially aligned state approximately parallel to the second piece string 52.

The wrist section 6 is attached to the tip of the arm section 5. The wrist section 6 includes fourth to sixth joints J4 to J6. The fourth to sixth joints J4 to J6 have three axes of rotation RA4 to RA6, respectively, that are orthogonal. The fourth joint J4 is a torsional rotation joint that rotates on the fourth axis of rotation RA4 that approximately matches an extension and contraction center axis RA3. The suction pad 7 is oscillatingly rotated by rotation of the fourth joint J4. The fifth joint J5 is a bending rotation joint that rotates on the fifth axis of rotation RA5 perpendicular to the fourth axis of rotation RA4. The suction pad 7 is tilted and rotated to front and rear by rotation of the fifth joint J5. The sixth joint J6 is a torsional rotation joint that rotates on the sixth axis of rotation RA6 perpendicular to the fourth axis of rotation RA4 and the fifth axis of rotation RA5. The suction pad 7 is axially rotated by rotation of the sixth joint J6.

The suction pad 7 is, for example, a bellows tube made of silicon resin that has a tip which expands in a cone shape. An air compressor is connected through an air tube to the suction pad 7. When the air compressor drives in a state in which the tip of the suction pad 7 has been brought into contact with the rear face of a piece of tableware, the piece of tableware is attached by suction to the suction pad 7 by means of a negative pressure inside the suction pad 7 that forms a closed space with the piece of tableware. When the air compressor stops, the inside of the suction pad 7 returns to atmospheric pressure and the piece of tableware is released.

Figure 5:
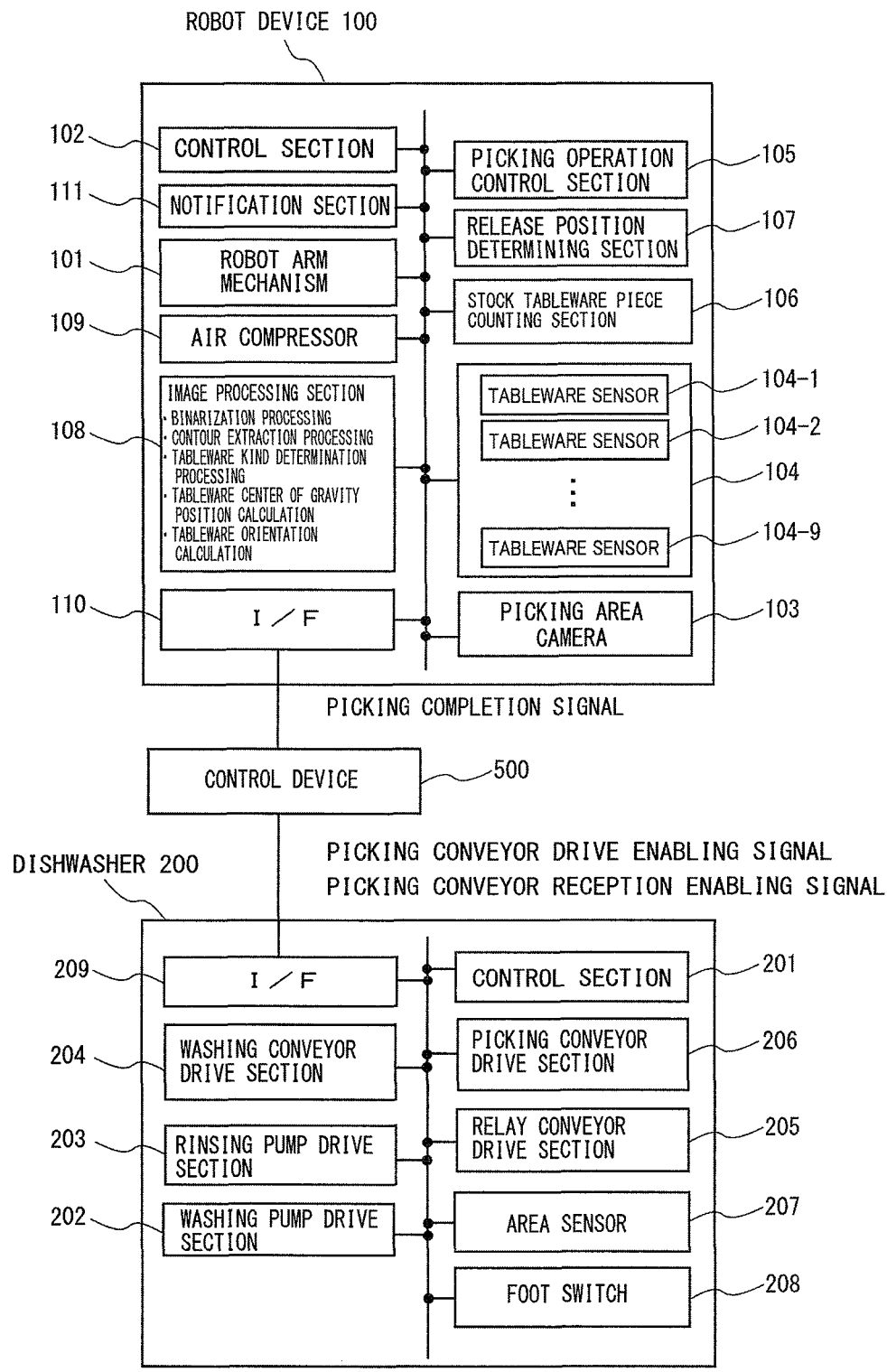
FIG. 5 is a block diagram illustrating a configuration of the dishwashing system according to the present embodiment.

In FIG. 5, a functional configuration of the dishwashing system according to the present embodiment is shown by means of a block diagram. A robot device 100 includes the aforementioned robot arm mechanism 101, picking area camera 103, and tableware sensors 104, and also includes: a control section 102 that performs overall control of the robot device 100; an image processing section 108 that processes an image acquired by the picking area camera 103 and determines the kind of tableware such as a large bowl, a plate or a small bowl and also calculates a center of gravity position (pick-up position) of the tableware and the posture of the tableware; a stock tableware piece counting section 106 that counts the number of tableware pieces that are placed in the stock area with respect to each release position; a release position determining section 107 that determines a release position in the stock area for each piece of tableware on the picking area; a picking operation control section 105 that controls the robot arm mechanism 101 so as pick up a piece of tableware from the picking area and release the piece of tableware in a release area; an air compressor 109 that is connected through an air tube to the suction pad 7; a notification section 111 that is installed on the stock stand 410 or in the vicinity thereof; and an interface 110 for sending and receiving signals to and from a control device 500 that is described later. For convenience of description, it is assumed that there are three kinds of tableware, namely, large bowls, plates and small bowls. Further, it is assumed that there are eight release positions, namely, release positions PR1 to PR8. When the number of stacked tableware pieces present at least at one position among the release positions PR1 to PR8 reaches a predetermined upper limit number, such as six pieces, in accordance with control of the control section 102, the notification section 111 notifies a worker to that effect by means of at least one of light, sound and vibration, and preferably by means of light, sound and vibration. Note that, with regard to a vibrational notification, such a notification is performed by transmitting a trigger signal for actuating a vibrator function from the notification section 111 by means of, typically, radio communication to a portable terminal having the vibrator function which a worker carries on their person.

The image processing section 108 binarizes an image acquired by the picking area camera 103, extracts contours in the binarized image, and subjects the contours to, for example, pattern matching processing to determine the kind of tableware, such as large bowls, plates, or small bowls. Naturally, when the image processing section 108 cannot extract a contour of a piece of tableware from an image acquired by the picking area camera 103, the image processing section 108 outputs an image processing result indicating that there is no tableware present. The image processing section 108 arbitrarily uses a preexisting technique to calculate a center of gravity position of a closed region of a contour as a pick-up position. Here, it will be assumed that a projected shape with respect to the inverted posture of the tableware is a circle in the case of a large bowl and a small bowl, and is a rectangle, not a circle, in the case of a plate. When the determined result is a plate, the image processing section 108 calculates the posture of the tableware, for example, a center line that is parallel to the longitudinal direction. By calculating the posture of the plate, it is possible to stack plates in a manner in which the postures of the plates are aligned when the plates are released.

When the contour of a tableware region could not be extracted as a result of processing by the image processing section 108, that is, when tableware is not present in the picking area, the control section 102 sends a signal (picking completion signal) indicating that picking is completed and there is no tableware in the picking area to the control device 500. Note that, a configuration may be adopted in which the control section 102 sends the picking completion signal to the control device 500 when the number of contours of tableware regions obtained as the result of processing by the image processing section 108 is less than or equal to a predetermined number, such as two, that is, when the number of tableware pieces in the picking area is less than or equal to a predetermined number such as two.

The tableware sensors 104-1 to 104-8 indicate an off state when there is no tableware at the release positions PR1 to PR8 that correspond thereto, respectively, and indicate an on state when there is tableware at the release positions PR1 to PR8 that correspond thereto, respectively. When a worker moves stocked tableware to a tableware storage rack, the tableware sensor (among 104-1 to 104-8) for the release position (among PR1 to PR8) at which the tableware had been placed changes from an on state to an off state. The stock tableware piece counting section 106 counts the number of releases for each of the release positions PR1 to PR8 in accordance with release operations performed by the robot arm mechanism 101 as the number of tableware pieces that are stocked, and furthermore, when any of the tableware sensors 104-1 to 104-8 indicates an off state, the stock tableware piece counting section 106 resets the count value for the number of tableware pieces at the relevant release position to zero.

Note that, although an example is described here in which the count value for the number of tableware pieces at the relevant release position is reset to zero by taking as a trigger the fact that the corresponding photoelectric sensor among the photoelectric sensors (tableware sensors) 104-1 to 104-8 indicates an off state, the present invention is not limited thereto. For example, a configuration may be adopted in which a stock area camera that photographs the stock area is installed separately from the picking camera, and an image of the stock area photographed by the stock area camera is processed by the image processing section 108, and when a contour of a piece of tableware cannot be extracted at a given release position, the count of the number of tableware pieces for the release position is question is reset to zero. Further, a configuration may be adopted in which a user operation section consisting of a touch panel or a display is installed at a stock stand 601 or the vicinity thereof, and when a worker (user) moves stocked tableware to a tableware storage rack, the worker performs an operation on the touch panel to tap an icon representing whichever of the release positions the tableware in question had been placed at, to thereby reset the count value for the number of tableware pieces for the release position in question to zero.

The release position determining section 107 allocates three release positions PR1 to PR3 among the release positions PR1 to PR8 as release positions that are exclusively for use for large bowls, and similarly allocates another three release positions PR4 to PR6 as release positions that are exclusively for use for small bowls, and allocates the remaining two release positions PR7 and PR8 as release positions that are exclusively for use for plates. The upper limit number for the number of tableware pieces to be stacked at each of the release positions PR1 to PR8 is decided in advance, and in this example it is assumed that the upper limit number is six. Further, for the release positions PR1 to PR3 that are exclusively for use for large bowls, an order of priority is set in that order, and similarly for the release positions PR4 to PR6 that are exclusively for use for small bowls, an order of priority is set in that order, and an order of priority is set for the release positions PR7 and PR8 that are exclusively for use for plates in that order.

When the number of tableware pieces that are stacked at least at one position among the release positions PR1 to PR8 reaches the upper limit number, the control section 102 controls the notification section 111 to cause the notification section 111 to output at least one trigger signal among sound, light and a vibration for prompting a worker to shift the tableware pieces in question.

Among the release positions that are allocated to the kind of tableware that was determined by the image processing section 108, the release position determining section 107 counts the number of tableware pieces at each release position using the stock tableware piece counting section 106, extracts release positions at which the number of tableware pieces that are being held will not reach the upper limit number, and selects the release position having the highest order of priority among the extracted release positions.

As described above, the respective kinds, center of gravity positions and postures of a plurality of tableware pieces within the picking area are calculated by the image processing section 108, and that information is used by the picking operation control section 105 to determine the sequential order in which to pick up the tableware. For example, it will be assumed here that large bowls are the objects to be picked up with highest priority, small bowls are second in the order of priority, and plates are last in the order of priority. Among tableware of the same kind, on the downstream side of the picking conveyor 330, tableware is picked up in the order of shortest distance to the center of gravity position of the tableware from a corner portion on the front side of the robot arm mechanism 101.

The picking operation control section 105 calculates a trajectory of the suction pad 7 based on the center of gravity position (pick-up position) of the respective tableware pieces in accordance with the aforementioned sequential order, a pick-up height that depends on the tableware height that is specific to the kind of tableware in question, a release position that is determined by the release position determining section 107, and a release height that is determined based on the number of tableware pieces which are stacked and the tableware height that is specific to the kind of tableware at the relevant release position, and performs sequential control of the robot arm mechanism 101 in accordance with the trajectory. The dishwasher 200 includes: a control section 201 that performs overall control of the dishwasher 200; a washing pump drive section 202 that drives the washing pump in the machine chamber; a rinsing pump drive section 203 that drives the rinsing pump in the machine chamber; a washing conveyor drive section 204 that drives the washing conveyor 310; a relay conveyor drive section 205 that drives the relay conveyor 320; a picking conveyor drive section 206 that drives the picking conveyor 330; an area sensor 207 that is installed on both sides of the relay conveyor 320; a foot switch 208 which a worker steps on and presses downward to cause the dishwashing operation to start; and an interface 209 for sending and receiving signals to and from the control device 500. Upon receiving a picking completion signal from the robot device 100, the control device 500 selectively transmits a picking conveyor drive enabling signal and a picking conveyor reception enabling signal to the dishwasher 200. As described above, the picking completion signal is generated by the control section 102 of the robot device 100 when picking up of all of the tableware on the picking area is completed by the robot arm mechanism 101 and no tableware pieces are present in the picking area. At such time, the picking conveyor drive enabling signal is generated by the control device 500. Upon receiving the picking conveyor drive enabling signal, the control section 201 of the dishwasher 200 controls the picking conveyor drive section 206 to cause the picking conveyor 330 to move by an amount equivalent to the length of the picking area, in this case, half the machine length. By this means, tableware on a waiting area on the upstream side of the picking conveyor 330 is conveyed to the picking area.

Upon receiving a picking completion signal from the robot device 100 after generating the picking conveyor drive enabling signal, the control device 500 generates a picking conveyor reception enabling signal and sends the picking conveyor reception enabling signal to the dishwasher 200. As described above, the picking conveyor drive enabling signal causes the picking conveyor 330 to move by half the machine length thereof (400 mm), and thus tableware on the waiting area on the upstream side of the picking conveyor 330 is conveyed to the picking area, and generation of a picking completion signal thereafter means that not even one piece of tableware is present on the belt surface of the picking conveyor 330. When the control section 201 of the dishwasher 200 receives the picking conveyor reception enabling signal, the control section 201 controls the relay conveyor drive section 205 to cause the relay conveyor 320 to move by the machine length thereof (600 mm), and in operative association therewith, controls the picking conveyor drive section 206 to cause the picking conveyor 330 to move by the machine length thereof (800 mm). By this means, tableware on the relay conveyor 320 is passed to the picking conveyor 330, and tableware is conveyed to the waiting area and the picking area.

Figure 6A:
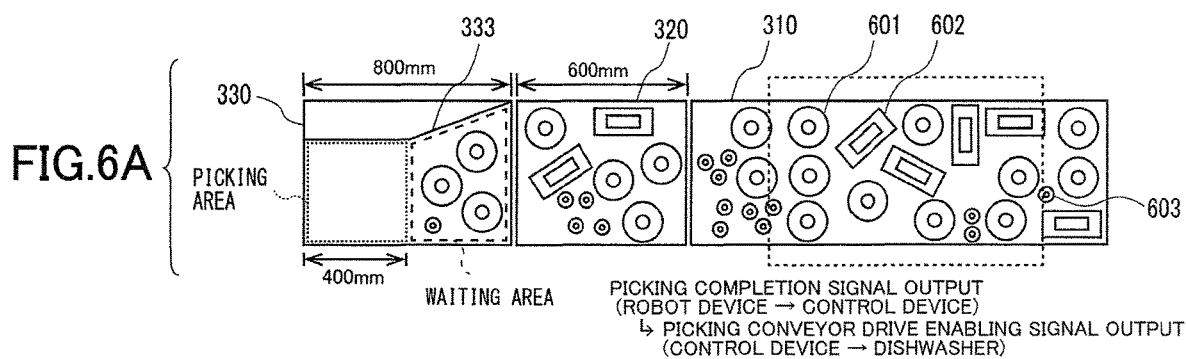
FIGS. 6A, 6B, 6C, and 6D are plan views illustrating movements of a picking conveyor and a relay conveyor that relate to a picking operation in the present embodiment.

These operations will now be described in further detail with reference to FIG. 6. FIG. 6A illustrates a typical state in which, during the process of dishwashing and picking, all tableware that was in the picking area has been transferred to the stock area. A plurality of large bowls 601, a plurality of plates 602 and a plurality of small bowls 603 as a plurality of tableware pieces are placed irregularly over almost the entire area of the placement surface of the belt of the washing conveyor 310. A plurality of tableware pieces are also placed over the entire placement surface of the relay conveyor 320. There is no tableware on the picking area of the picking conveyor 330, and there is a plurality of tableware pieces on the waiting area on the upstream side thereof. Since there is no tableware on the picking area, a picking conveyor drive enabling signal is sent to the external control device 500 from the control section 102.

Figure 6B:
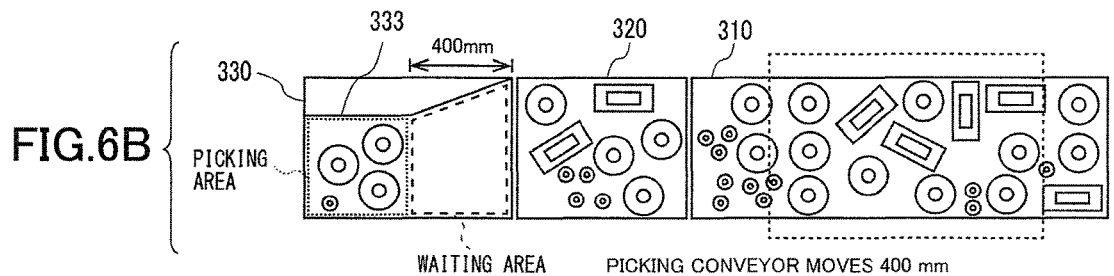

The control device 500 that received the picking completion signal from the robot device 100 sends a picking conveyor drive enabling signal with respect to the dishwasher 200 to the control section 201 of the dishwasher 200. Upon receiving the picking conveyor drive enabling signal, the control section 201 of the dishwasher 200 controls the picking conveyor drive section 206, and causes the picking conveyor 330 to move and, as shown in FIG. 6B, then stops the picking conveyor 330 when the picking conveyor 330 has moved half the machine length thereof, for example, 400 mm. Accompanying movement of the picking conveyor 330, the tableware within the waiting area is guided by the guide rail 333 and conveyed to the picking area while being drawn little by little toward the side of the robot arm mechanism 101. At this stage there is no tableware in the waiting area, and there is tableware in the picking area.

Figure 6C:
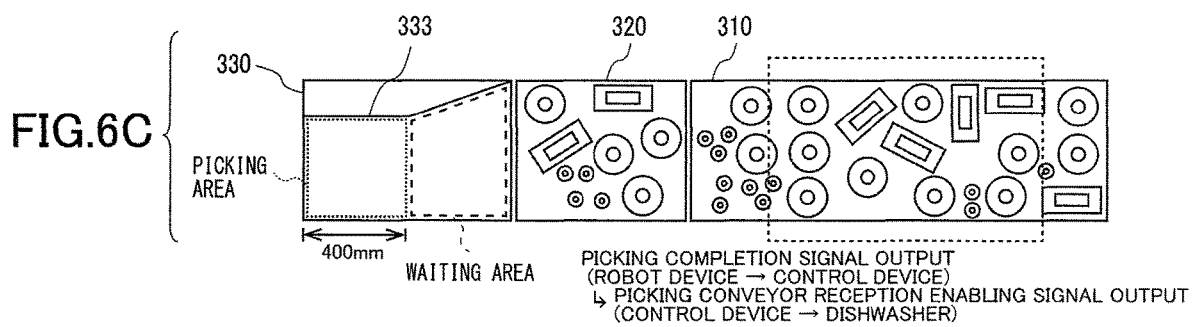

The tableware that has been newly conveyed to the picking area is sequentially transferred to the stock area by the robot arm mechanism 101. As shown in FIG. 6C, when a state is entered in which all of the tableware that was in the picking area has been transferred to the stock area and there is no tableware in the picking area of the picking conveyor 330, a picking conveyor drive enabling signal is sent once again from the control section 102 of the robot device 100 to the external control device 500. At this stage, there is no tableware in either the picking area or the waiting area, that is, the state is one in which there is not even one piece of tableware on the belt surface of the picking conveyor 330.

After sending the picking conveyor drive enabling signal to the control section 201 of the dishwasher 200, when the control device 500 receives a picking completion signal from the robot device 100, the control device 500 then sends a picking conveyor reception enabling signal to the control section 201 of the dishwasher 200.

Figure 6D:
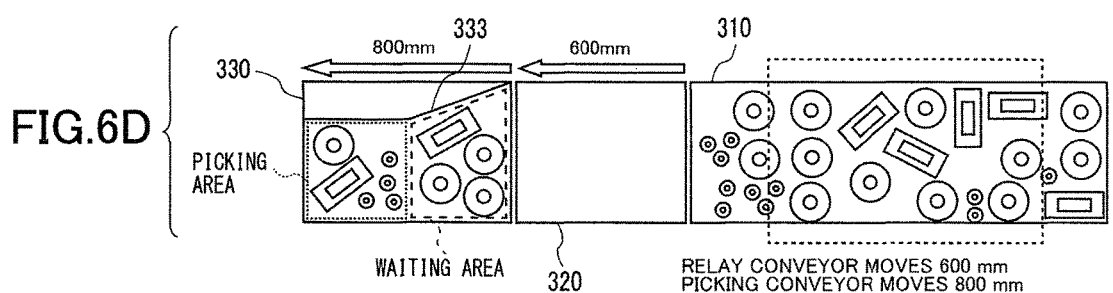

Upon receiving the picking conveyor reception enabling signal, as shown in FIG. 6D, the control section 201 of the dishwasher 200 controls the relay conveyor drive section 205 and the picking conveyor drive section 206 to cause the relay conveyor 320 and the picking conveyor 330 to start to move simultaneously and at the same speed. Subsequently, at a time point at which the relay conveyor 320 has moved the machine length (600 mm) thereof, the control section 201 stops the relay conveyor 320. Thereafter, the control section 201 stops the picking conveyor 330 at a time point at which the picking conveyor 330 has moved the machine length (800 mm) thereof. At this stage, there is no tableware on the relay conveyor 320, and there is tableware on the waiting area and on the picking area of the picking conveyor 330.

The tableware that has been newly conveyed to the picking area is sequentially transferred to the stock area by the robot arm mechanism 101, and when a state is entered in which all of the tableware in the picking area has been transferred to the stock area and thus there is no tableware present in the picking area of the picking conveyor 330, the situation returns to the state illustrated in FIG. 6A and the same operations as described above are repeated.

Next, dishwashing operations will be described. FIG. 7A illustrates the same state as in FIG. 6C. That is, tableware is present over the entire area of the relay conveyor 320. In this state, all of the photoelectric sensors of the area sensor 207 indicate an off state. When the area sensor 207 indicates an off state, the control section 201 of the dishwasher 200 transitions to an interlock state and suspends the dishwashing operation. By this means, the washing conveyor 310 is stopped together with the relay conveyor 320, and the washing pump and rinsing pump are also stopped. Even if a worker steps on the foot switch 208 and presses downward to turn on the foot switch 208, the dishwashing operation does not resume as long as the interlock state is not released. The dishwashing operation resumes when, in a state in which the interlock has been released, a worker steps on the foot switch 208 and presses downward to turn on the foot switch 208. Further, a configuration may be adopted in which the dishwashing operation resumes automatically when tableware is not present on the relay conveyor 320, and the area sensor 207 indicates an on state.

FIG. 7B illustrates the same state as in FIG. 6D. That is, FIG. 7B illustrates a state in which tableware has been conveyed from the relay conveyor 320 to the picking conveyor 330, and tableware is no longer present on the relay conveyor 320. In this state, because there is no tableware present on the relay conveyor 320, the area sensor 207 indicates an on state. Therefore, the control section 201 of the dishwasher 200 releases the interlock state and enables a washing operation. The dishwashing operation resumes when the worker steps on the foot switch 208 and presses downward to turn on the foot switch 208. As shown in FIG. 7C, the washing conveyor 310 and the relay conveyor 320 start to move, and in accompaniment therewith the washing pump and the rinsing pump also resume operations. Subsequently, as shown in FIG. 7D, when tableware is present over the entire area of the relay conveyor 320 and the area sensor 207 indicates an off state, the control section 201 of the dishwasher 200 transitions to an interlock state and suspends the washing operation.

In this case, even when tableware is present over the entire area of the relay conveyor 320, and the area sensor 207 indicates an off state, during a period in which the control section 201 receives the picking conveyor reception enabling signal from the control device 500 and, in response thereto, the relay conveyor 320 moves by a distance corresponding to the machine length (600 mm) thereof, because tableware does not stay stagnate on the relay conveyor 320, there is no necessity to stop the washing operation, and therefore the control section 201 does not transition to an interlock state during that period.

Accordingly, it is possible to proceed with a washing operation concurrently with a picking operation, and the influence which the picking operation has on the washing operation can be kept to a minimum. More specifically, as will be understood from FIG. 7B to FIG. 7D, in a case where the time period required by the robot device 100 to pick up all of the tableware on the picking conveyor 330 (picking time period) is shorter than the time period required for the relay conveyor 320 to move by a distance corresponding to the machine length thereof (600 mm), the picking conveyor reception enabling signal will always be generated before transitioning to an interlock, and thus the washing operation will not be suspended. On the other hand, even in a case where the picking time period is longer than the time period required for the relay conveyor 320 to move by a distance corresponding to the machine length thereof (600 mm), the time difference between the aforementioned time periods can be shortened during a period in which the washing operation is suspended while waiting for picking up of tableware to be completed.

Figure 8A:
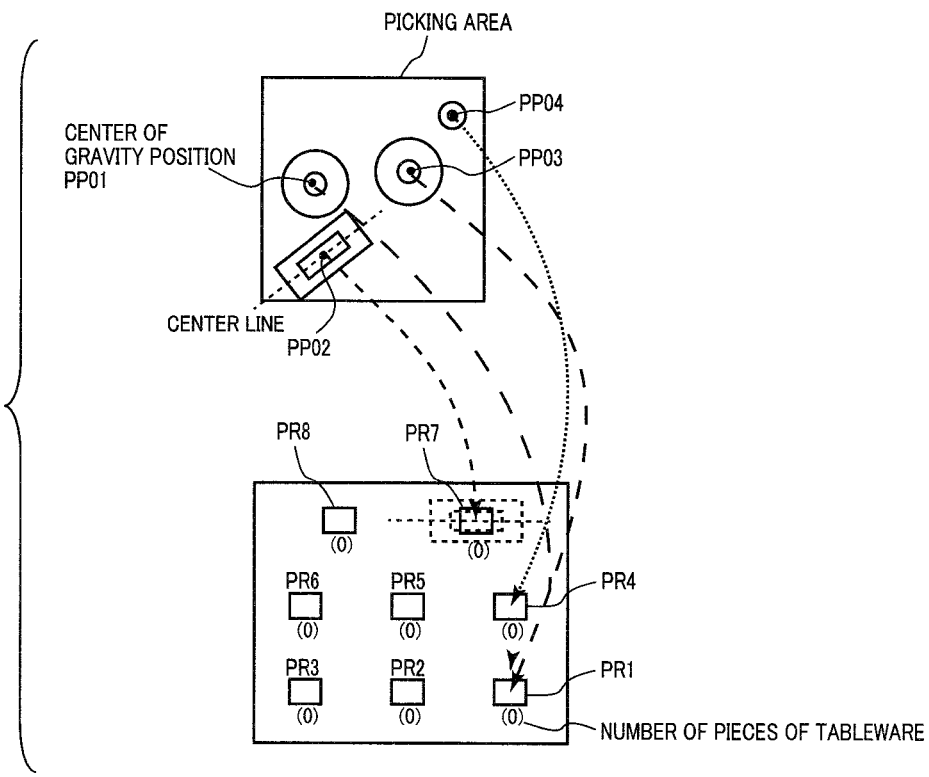
FIGS. 8A and 8B are supplementary explanatory diagrams for describing a release position determining process in the present embodiment.
Figure 8B:
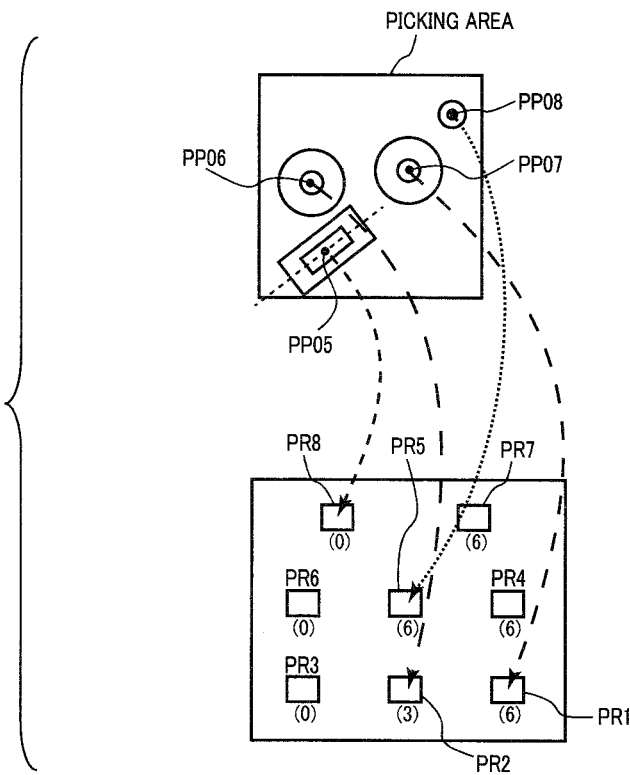

Next, the details of release position determining processing and the like will be described. FIG. 8A illustrates a case where the number of tableware pieces at each of the release positions is zero. FIG. 8B illustrates a case where the number of tableware pieces at release positions having a high priority level is not zero. The image processing section 108 determines whether or not tableware is present in the picking area based on an image (picking area image) photographed by the picking area camera 103, and in a case where it is determined that there is tableware in the picking area, the image processing section 108 identifies the kind of tableware, the center of gravity position of the tableware, and the posture of the tableware. Specifically, a pattern is registered in advance for each kind of tableware (large bowl, plate, small bowl). The image processing section 108 subjects the picking area image to binarization processing, extracts contours of tableware from the binarized picking area image, executes pattern matching processing, and determines whether or not tableware is present in the picking area, and if so, determines the kind of tableware that is present. The image processing section 108 calculates center of gravity positions (pick-up positions) PP01 to PP04 of the contours of the tableware extracted from the picking area image. The center of gravity positions PP01 to PP04 are represented with a robot coordinate system, and are used as the pick-up positions for the tableware in question by the robot arm mechanism 101. In addition, the image processing section 108 calculates an angle of inclination for a determined plate with respect to a reference line that is defined at the release position. Specifically, as shown in FIG. 8A, the image processing section specifies a center line in the longitudinal direction of a plate in the picking area, and as the angle of inclination, calculates the angle by which the center line of the plate in the picking area is inclined relative the center line in the longitudinal direction of the plate that is defined at the release position. By identifying the posture of the plate in the picking area, the postures of the respective tableware pieces can be aligned when the tableware pieces are released by the robot arm mechanism 101, and by this means the tableware can be stored in a stacked manner. When a specific pattern is not abstracted from the picking area image, that is, when there is no tableware in the picking area, the control section 102 of the robot device 100 outputs the aforementioned picking completion signal (picking completion signal).

The stock tableware piece counting section 106 counts the number of releases for each release position defined in the stock area, and holds a count value for each release position. Tableware sensors 104-1 to 104-8 are installed at positions corresponding to the release positions PR1 to PR8 of the robot arm mechanism, respectively. The respective tableware sensors 104-1 to 104-8 indicate an off state when tableware is not present at the release position corresponding thereto among the release positions PR1 to PR8, and indicate an on state when tableware is present. When tableware in the stock rack is moved by a worker, the tableware sensor 104 corresponding to the position at which the relevant tableware had been stacked transitions from an on state to an off state. The stock tableware piece counting section 106 resets the count value for the release position corresponding to tableware sensor 104 that transitioned from an on state to an off state to zero.

The release position determining section 107 determines the release position for the tableware that was picked up the robot arm mechanism 101, based on the number of releases for each of the release positions PR1 to PR8 and the kind and number of tableware pieces in the stock area. Specifically, the release position determining section 107 determines the release position for picked up tableware in the following manner. Note that, as shown in FIG. 8, it will be assumed here that among the release positions PR1 to PR8, three release positions PR1 to PR3 in a horizontal row that are furthest from the picking area are set in advance as release positions for large bowls, three release positions PR4 to PR6 in a horizontal row that are further to the front relative to the release positions for large bowls are set in advance as release positions for small bowls, and the remaining two release positions PR7 and PR8 are set in advance as release positions for plates. Further, an order of priority is set for the three release positions PR1 to PR3 for large bowls, the three release positions PR4 to PR6 for small bowls, and the two release positions PR7 and PR8 for plates, respectively. For example, for the plurality of release positions for each kind of tableware, the order of priority is set in the order of distance from the installation position of the robot arm mechanism 101. In this case, for the three release positions PR1 to PR3 for large bowls, the order of priority is assigned in the order of release positions PR1, PR2 and PR3. Similarly, for the three release positions PR4 to PR6 for small bowls, the order of priority is assigned in the order of release positions PR4, PR5 and PR6. For the two release positions PR7 and PR8 for plates, the order of priority is assigned in the order of release positions PR7 and PR8. In addition, an upper limit value of the number of tableware pieces to be stacked, that is, an upper limit value of the number of releases, is set for each release position. The upper limit value of the number of releases is, for example, set to 6.

The release position determining section 107 determines the release positions that are set for the kinds of tableware that were determined by the image processing section 108 from among the plurality of release positions PR1 to PR8. From among the determined release positions, the release position determining section 107 extracts release positions with respect to which the number of releases for the respective release positions that is being held by the stock tableware piece counting section 106 has not reached the maximum value. The release position determining section 107 then selects the release position which has the highest order of priority among the extracted release positions. For example, as shown in FIG. 8A, the release position determining section 107 determines the release position PR1 as the release position for large bowls having the center of gravity positions PP01 and PP02, determines the release position PR4 as the release position for small bowls having the center of gravity position PP04, and determines the release position PR7 as the release position for plates having the center of gravity position PP02.

In the example shown in FIG. 8B, the number of releases for the release position PR1 which has the highest priority among the release positions PR1 to PR3 for large bowls is 5. The release position determining section 107 determines the release position PR1 as the release position for a center of gravity position PP06 that was determined as being a large bowl. Consequently, because the number of releases for the release position PR1 will thereby reach the upper limit, the release position determining section 107 moves the release position for a large bowl having a center of gravity position PP07 to the release position PR2 that is second in the order of priority. Similarly, because the number of releases for the release position PR4 having the highest priority among the release positions PR4 to PR6 for small bowls has reached the upper limit value, the release position PR5 is determined as the release position for a small bowl having a center of gravity position PP08. Similarly, because the number of releases for the release position PR7 having the highest priority among the release positions PR7 and PR8 for plates has reached the upper limit value, the release position PR8 is determined as the release position for a plate (PP05).

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions

REFERENCE SIGNS LIST

101 . . . ROBOT ARM MECHANISM, 200 . . . CONVEYOR-TYPE DISHWASHER, 210 . . . WASHING MACHINE MAIN BODY, 310 . . . WASHING CONVEYOR, 320 . . . RELAY CONVEYOR, 330 . . . PICKING CONVEYOR, 400 . . . STOCK RACK.

The invention claimed is:

1. A dishwashing system, comprising:
a conveyor-type dishwasher that washes tableware in a washing chamber of a washing machine main body while conveying the tableware by means of a conveyor;
the conveyor comprises:
a first conveyor section;
a second conveyor section;
a relay conveyor section that relays the tableware between the first conveyor section and the second conveyor section;
a robot device including a robot arm mechanism that is installed in the vicinity of a picking area to pick up the tableware that is conveyed to the picking area from the washing chamber by the conveyor, and transfer the tableware to a stock area; and
a control device that is configured to generate an enabling signal relating to operations of the conveyor with respect to the dishwasher, wherein:
the control device generates the enabling signal when the tableware is not present in the picking area or when a number of pieces of the tableware is equal to or less than a predetermined number;
the first conveyor section conveys the tableware in the washing chamber of the washing machine main body, the second conveyor section conveys the tableware that is washed in the washing chamber to the picking area, and
the relay conveyor section moves alternatively in operative association with the first conveyor section and the second conveyor section.

2. The dishwashing system according to claim 1, wherein: when the dishwasher receives the enabling signal, the second conveyor section moves a distance that is equivalent to a length of the picking area.

3. The dishwashing system according to claim 1, wherein: when the dishwasher receives the enabling signal, the relay conveyor moves in operative association with movement of the second conveyor.

4. The dishwashing system according to claim 1, wherein: when the dishwasher receives the enabling signal, the relay conveyor and the second conveyor move a distance that is equivalent to a machine length thereof, respectively.

5. The dishwashing system according to claim 1, wherein: when the tableware is not present on the relay conveyor, the washing machine main body executes a washing operation, and the first conveyor moves in operative association with movement of the relay conveyor.

6. The dishwashing system according to claim 5, wherein: when the tableware is present on the relay conveyor, the washing machine main body stops, and the first conveyor stops together with the relay conveyor.

7. The dishwashing system according to claim 1, wherein the robot device comprises:
the robot arm mechanism;
a camera that photographs the picking area;
an image processing section that processes an image of the picking area that is photographed by the camera, and determines whether or not the tableware is present, a kind of the tableware, a position of the tableware, and a posture of the tableware;
a release position determining section that determines a release position on the stock area based on a kind of the tableware, and a number of stacked pieces of the tableware in the stock area;
a picking operation control section that controls a picking operation by the robot arm mechanism based on the pick-up position and the release position; and
an output section that, when the tableware is not present in the picking area or when a number of pieces of the tableware is equal to or less than a predetermined number, outputs to the control device a signal indicating that the tableware is not present in the picking area or that a number of pieces of the tableware is equal to or less than a predetermined number.

8. The dishwashing system according to claim 7, wherein the robot device further comprises:
a reflection-type photoelectric sensor that is installed at a release position on the stock area; and
a counting section that counts a number of releases for each release position of the stock area as a number of stacked pieces of the tableware, and resets a count value to zero when the reflection-type photoelectric sensor enters an off state.

9. The dishwashing system according to claim 7, wherein the robot device further comprises:
another camera that photographs the stock area; and
a counting section that counts a number of releases for each release position of the stock area as a number of stacked pieces of the tableware, and resets a count value to zero based on a result of image processing of an image of the stock area that is photographed by the other camera.

10. The dishwashing system according to claim 7, wherein the robot device further comprises:
a user operation section; and
a counting section that counts a number of releases for each release position of the stock area as a number of stacked pieces of the tableware, and resets a count value to zero in accordance with an operation performed at the user operation section.

11. The dishwashing system according to claim 8, wherein:
the release position determining section moves the release position when a number of stacked pieces of the tableware reaches a predetermined number of pieces.

12. The dishwashing system according to claim 8, wherein:
the robot device further comprises a notification section that, when a number of stacked pieces of the tableware reaches a predetermined number of pieces, notifies a fact that a number of stacked pieces of the tableware reached a predetermined number of pieces by means of at least one of light, sound and vibration.

13. The dishwashing system according to claim 1, wherein:
the robot arm mechanism is a polar coordinates-type mechanism that includes a linear extension and retraction mechanism.

14. A robot device, comprising:
a robot arm mechanism that is installed in the vicinity of a picking area to pick up a work piece in the picking area and transfer the work piece to a stock area;
a camera that photographs the picking area;
an image processing section that processes an image of the picking area that is photographed by the camera, and determines whether or not the work piece is present, a kind of the work piece, a position of the work piece, and a posture of the work piece;
a release position determining section that determines a release position on the stock area based on a kind of the work piece, and a number of stacked pieces of the work piece in the stock area;
a picking operation control section that controls a picking operation by the robot arm mechanism based on the pick-up position and the release position;
an output section that, when the work piece is not present in the picking area or when a number of pieces of the work piece is equal to or less than a predetermined number, outputs a signal indicating that the work piece is not present in the picking area or that a number of pieces of the work piece is equal to or less than a predetermined number to an external device,
a conveyor-type dishwasher that washes tableware in a washing chamber of a washing machine main body while conveying the tableware by means of a conveyor; and
the conveyor comprises:
a first conveyor section;
a second conveyor section;
a relay conveyor section that relays the tableware between the first conveyor section and the second conveyor section;
a control device that is configured to generates an enabling signal relating to operations of the conveyor with respect to the dishwasher, wherein:
the control device generate the enabling signal when the tableware is not present in the picking
the first conveyor section conveys the tableware in the washing chamber of the washing machine main body,
the second conveyor section conveys the tableware that is washed in the washing chamber to the picking area, and
the relay conveyor section moves alternatively in operative association with the first conveyor section and the second conveyor section.

15. The robot device according to claim 14, further comprising:
a reflection-type photoelectric sensor that is installed at a release position on the stock area; and
a counting section that counts a number of releases for each release position of the stock area as a number of stacked pieces of the work piece, and resets a count value to zero when the reflection-type photoelectric sensor enters an off state.

16. The robot device according to claim 14, further comprising:
another camera that photographs the stock area; and
a counting section that counts a number of releases for each release position of the stock area as a number of stacked work pieces, and resets a count value to zero based on a result of image processing of an image of the stock area that is photographed by the other camera.

17. The robot device according to claim 14, further comprising:
a user operation section; and
a counting section that counts a number of releases for each release position of the stock area as a number of stacked pieces of the work piece, and resets a count value to zero in accordance with an operation performed at the user operation section.

18. The robot device according to claim 15, wherein:
the release position determining section moves the release position when a number of stacked pieces of the work piece reaches a predetermined number of pieces.

19. The robot device according to claim 15, further comprising:
a notification section that, when a number of stacked pieces of the work piece reaches a predetermined number of pieces, notifies a fact that a number of stacked pieces of the work piece reached a predetermined number of pieces by means of at least one of light, sound and vibration.

20. The robot device according to claim 14, wherein:
the robot arm mechanism is a polar coordinates-type mechanism that includes a linear extension and retraction mechanism.

* * * * *